United States Patent [19]
Mead

[11] Patent Number: 4,781,526
[45] Date of Patent: Nov. 1, 1988

[54] FAN AND FILTER COMBINATION

[76] Inventor: Clarence Mead, 3809 P Dr., North, Battle Creek, Mich. 49017

[21] Appl. No.: 114,675

[22] Filed: Oct. 29, 1987

[51] Int. Cl.$^4$ .................. F04D 29/70; B01D 46/10
[52] U.S. Cl. .................. 415/121 G; 416/247 R; 55/501; 55/493; 248/224.4
[58] Field of Search .............. 415/121 G, 201, 121 A, 415/121 R; 416/247 R; 55/493, 508, 510, DIG. 31, 501; 248/223.4, 224.4, 225.1, 448; 417/423 K

[56] References Cited

U.S. PATENT DOCUMENTS

| | | | |
|---|---|---|---|
| 2,053,124 | 9/1936 | Banks | 248/488 |
| 2,575,499 | 11/1951 | Manow | 55/493 X |
| 2,594,688 | 4/1952 | Shapiro | 415/201 X |
| 2,825,500 | 3/1958 | McLean | 55/501 X |
| 2,992,701 | 7/1961 | White | 415/121 G X |
| 3,606,589 | 9/1971 | Cameto et al. | 415/201 X |
| 4,099,944 | 6/1978 | Davis | 55/501 |
| 4,334,899 | 6/1982 | McConnell | 55/DIG. 31 X |

FOREIGN PATENT DOCUMENTS 3304093  8/1984  Fed. Rep. of Germany ... 415/121 R

Primary Examiner—Robert E. Garrett
Assistant Examiner—Joseph M. Pitko
Attorney, Agent, or Firm—Flynn, Thiel, Boutell & Tanis

[57] ABSTRACT

A fan-filter combination which can be used to remove air-borne contaminates in air that is directed into or exhausted from localized areas includes a filter affixed to a fan unit by a bracketing structure into which the filter is slidingly receivable.

12 Claims, 1 Drawing Sheet

U.S. Patent                Nov. 1, 1988                4,781,526
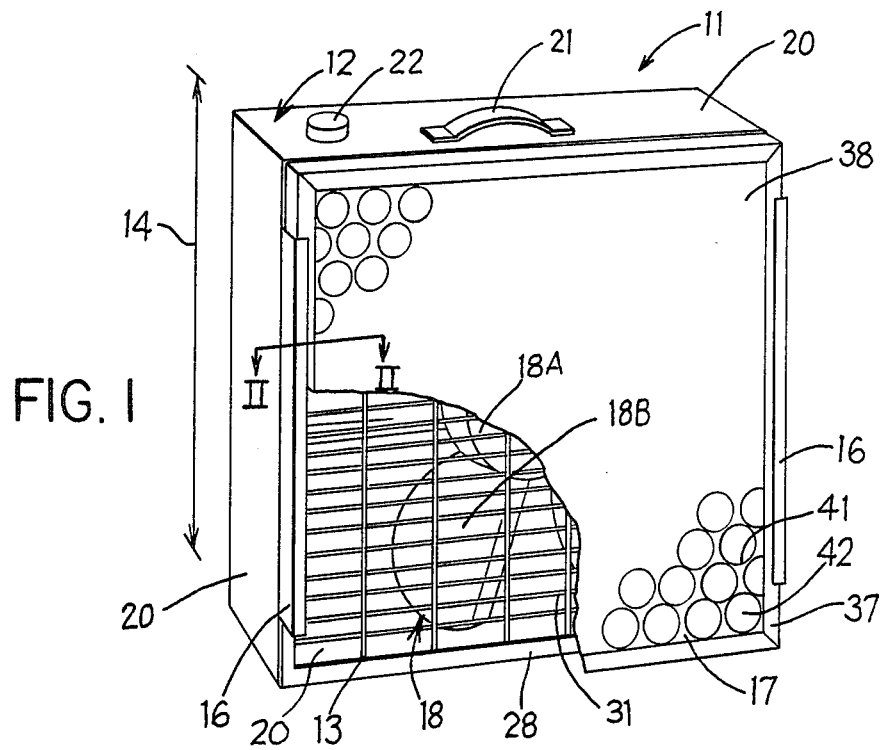
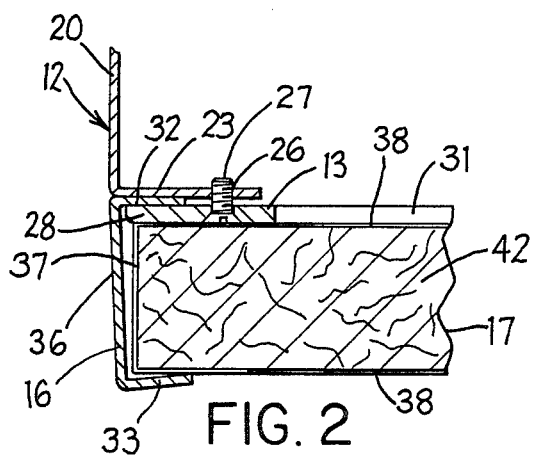
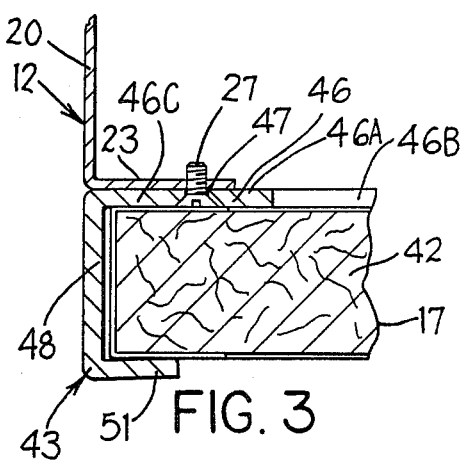
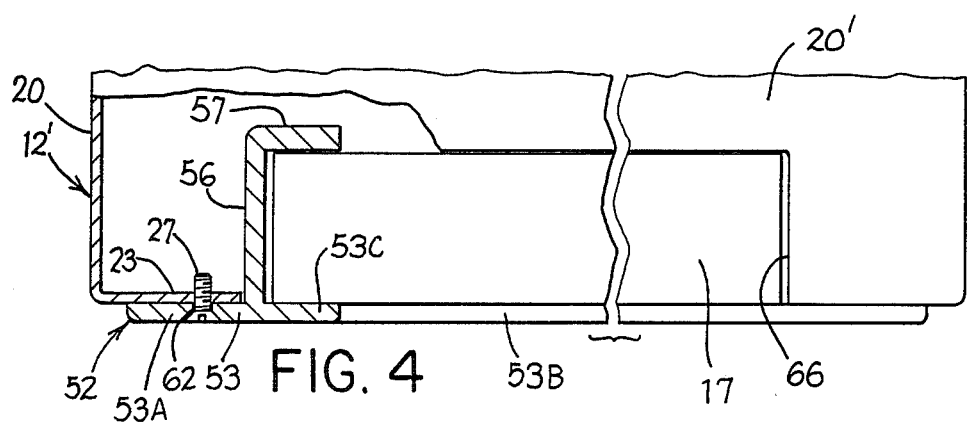

FAN AND FILTER COMBINATION

FIELD OF THE INVENTION

This invention relates to a novel fan-filter combination which can be used to provide a localized, filtered incoming air stream or be used to separate contaminates from an air stream that is expelled from a localized area.

BACKGROUND OF THE INVENTION

Portable fan units have enjoyed tremendous popularity with the general public. These fan units enable the user to selectively cool, ventilate or expel air from a specified location.

A problem with these fan units is that they do not provide for the separation of minute contaminants contained in the air. Therefore, a person suffering from an allergy or located adjacent to an environment containing dirt, dust or smog would have to endure these contaminants in order to enjoy the use of these fan units.

It is an object of this invention to provide a fan unit which separates minuscule contaminants contained in the air that passes through the fan. It is a further object of this invention to provide an effective and easy to install filter which can be used in combination with a standard portable fan.

SUMMARY OF THE INVENTION

A filter-fan combination for the removal of minuscule contaminates contained in air to be introduced into or expelled from a localized area comprises a fan housing, an air-movement arrangement and a filter element. A preferred embodiment of this novel filter-fan combination also comprises front and back grilles secured to the housing, and a bracketing arrangement, the filter element being slidingly receivable into the bracketing arrangement.

In a further embodiment of this invention, the bracketing arrangement and the back grille are formed into an integral unit which is attached to the housing.

In yet a further embodiment of this invention, the bracketing arrangement and the back grille are formed into an integral unit having a portion which extends into the housing.

BRIEF DESCRIPTION OF THE DRAWINGS

FIG. 1 shows in perspective view an embodiment of a fan-filter combination embodying the present invention.

FIG. 2 is a sectional view taken along the line II—II in FIG. 1 and shows a bracketing arrangement, a back grille and a fan housing which are discrete units.

FIG. 3 is a sectional view similar to FIG. 2 of another embodiment, wherein the back grille and the bracketing arrangement are formed into an integral unit.

FIG. 4 is a fragmentary sectional top view similar to FIG. 2 of yet another embodiment of the invention where the bracketing arrangement and the back grille are formed into an integral unit having a portion which extends into the fan housing.

DETAILED DESCRIPTION OF THE INVENTION

In the following discussion, the reference numerals assigned to particular elements of the instant invention will be consistent with respect to all of the figures.

A first embodiment of the fan-filter combination 11 is shown in FIGS. 1 and 2. This fan-filter combination 11 comprises a fan housing 12, a back grille 13, a similar front grille (which is not shown) on the opposite side of housing 12, brackets 16, a filter 17 and an air movement mechanism 18. The fan housing 12, front grille and back grille 13 form an enclosure in which the air movement mechanism 18 is contained. The air movement mechanism 18 is a motor 18A stationarily supported on the housing 12 and rotatably supporting several propeller blades 18B for effecting air flow into and out of the fan unit.

The fan housing 12 has four walls 20 and is in the shape of a square having sides approximately 22 inches long, which dimension is indicated at 14 in FIG. 1. The fan housing 12 has a handle 21 and an electric switch 22 located on its top wall. The handle 21 facilitates the handling of the fan and the electric switch 22 turns the fan motor on and off and also controls the speed at which the fan motor runs. The fan housing 12 has air inlet and air outlet openings located at opposite ends thereof and contains an air passage which connects the air inlet and air outlet openings. Inwardly extending flanges 23 are provided on the fan housing 12 at the front edge and back edges of each of the two vertically extending walls 20, and contain threaded holes 26 which receive flathead connecting screws 27 for the grilles.

The front and back grilles each integrally comprise a square frame 28 with a central opening and a grid 31 disposed in the opening. The frame 28 of each grille has holes through which the connecting screws 27 rotatably extend, each hole having a countersunk portion which receives the head of the associated screw.

The housing 12, air movement arrangement 18, and grilles 13 together constitute a fan unit which is a conventional and commercially available appliance.

The brackets 16 are affixed to the fan unit in a manner which enables the filter 17 to be slidingly supported adjacent to the back grille 13. The brackets 16 are U-shaped channel members which each have two legs 32 and 33 connected by a bight 36. The distance between the legs 32 and 33 is slightly less than the combined thickness of the filter 17 and the back grille 13. The legs 32 and 33 converge with respect to each other in a direction away from the bight 36 and each have a degree of inherent resilience. Consequently, the leg 33 forms an acute angle with respect to the bight 36 prior to insertion of the filter and, after insertion of the filter, resiliently urges the filter 17 against the back grille 13. These brackets 16 are affixed to the fan unit by loosening the screws 27 connecting the back grille 13 with the fan housing 12 in order to create a space therebetween in which the leg 32 of each bracket 16 can be inserted, and by subsequently retightening the screws 27 in order to clampingly secure the leg 32 of each bracket 16 between the back grille 13 and the housing 12. The filter 17 has each side portion thereof slidingly received between the legs of a respective bracket 16. This construction allows for the rapid attachment of the brackets 16 to the fan unit and ease of installation and removal of the filter 17.

A conventional and commercially available furnace filter is used as the filter 17 and is removed and cleaned (or replaced) when it becomes too dirty. The filter 17 includes a cardboard frame 37 having a square shape and sides approximately 22 inches long. The cardboard frame 37 has a central opening therethrough in which two spaced square metal sheets 38 are positioned, each metal sheet having a plurality of circular openings therethrough. Filter material 42 is provided between the metal sheets 38 and can consist of any material that is suitable for the intended service.

A second embodiment shown in FIG. 3 is similar to the first embodiment, except that the brackets and back grille are integrally formed as a single part 43 which is affixed to the housing 12. The part 43 has a back section 46 having a frame portion 46A and grid portion 46B which together define the back grille, the frame portion 46A having countersunk holes 47 through which the connecting screws 27 extend to maintain the fan housing flanges 23 and the back section 46 of the part 43 in intimate contact. The back section 46 of the part 43 also includes a leg portion 46C, and the part 43 thus has a bracket section defined by the leg portion 46C, a bright portion 48 extending outwardly from the leg portion 46C generally perpendicular thereto, and a leg portion 51 provided at the outer end of the bight portion 48, the leg portions converging away from the bight portion so that the distance between the leg portion 46C and the leg portion 51 is slightly less than the thickness of the filter 17. The leg portion 51 has some inherent resilience and is disposed at an acute angle with respect to the bight portion 48, so that it resiliently urges the filter 17 against the back section 46.

A third embodiment shown in FIG. 4 is similar to the embodiment of FIG. 3, except as follows. The back grille and the brackets are formed as an integral part 52 which is affixed to the fan housing 12′ by the screws 27. The integral part 52 of this third embodiment has a back section 53 which includes a leg portion 53C, and has a bight portion 56 and a further leg portion 57. The part 52 thus has a bracket section defined by the leg portions 53C and 57 and the bight portion 56. The back section 53 also includes a frame portion 53A and grid portion 53C which together with the leg portion 53C define the back grille. The frame portion 53A has holes 62 through which the connecting screws 27 extend to maintain the frame portion 61 of the part 52 and the flanges 23 of the fan housing 12′ in intimate contact. The bight portion 56 is disposed at a right angle with respect to the leg portion 53C and extends into the fan housing 12′. The leg portions 53C and 57 are located at opposite ends of the bight portion 56.

The fan housing 12′ of FIG. 4 is similar to the fan housing 12 of FIG. 1, except that the top wall 20′ has a rectangular opening 66 therein, through which the filter 17 can be inserted into and removed from the bracket portions of the part 52.

Referring again to FIG. 1, the housing 12, the back grille 13, and the brackets 16 may be constructed of the same or different materials, for example any suitable metal or plastic. The element of the filter 17 may be of any suitable porosity and material for the environment in which it is used.

Additional modifications and variations of this invention may be arrived at with out departing from the spirit or scope of the following claims.

The embodiments of the invention in which an exclusive property or privilege is claimed are defined as follows:

1. A portable fan apparatus, comprising: a housing having an inlet opening, an outlet opening and an air passage extending from said inlet opening to said outlet opening; air movement means disposed in said air passage for causing air to flow into said inlet opening, through said air passage and out said outlet opening; a filter; and means for removably supporting said filter on said housing upstream of said air movement means in a manner so that all air flowing through said air passage passes through said filter; wherein said means for removably supporting said filter includes two spaced U-shaped bracket portions which each include two leg portions connected by a bight portion, and means for fixedly supporting one of said leg portions of each said bracket portion on said housing, said filter having two opposite edge portions which are each slidably received between said leg portions of a respective said bracket portion; and wherein said means for removably supporting said filter includes a grille extending across said inlet opening of said housing and having opposite edge portions removably secured to respective portions of said housing by screws, and includes each said bracket portion having said one leg portion thereof disposed between said housing and a respective said edge portion of said grille and being fixedly clamped therebetween by said screws.

2. The fan apparatus of claim 1, wherein said bight portions of said bracket portions extend approximately parallel to each other.

3. The fan apparatus of claim 1, wherein said leg portions of each said bracket portion converge slightly with respect to each other in a direction away from said bight portion, and wherein each said bracket portion has a small degree of flexibility and inherent resilience, the distance between said leg portions being such that the leg portion of each said bracket portion other than said one leg portion thereof resiliently presses gainst said filter and thereby frictionally resists sliding movement of said filter relative to said bracket portions.

4. The fan apparatus of claim 1, wherein said filter is disposed against said grille on a side thereof remote from said air movement means.

5. The fan apparatus of claim 1, wherein said filter is a furnace filter of approximately rectangular shape and has a thickness substantially less than the length of each side thereof.

6. A portable fan apparatus, comprising: a housing having an inlet opening, an outlet opening and an air passage extending from said inlet opening to said outlet opening; air movement means disposed in said air passage for causing air to flow into said inlet opening, through said air passage and out said outlet opening; a filter; filter support means for removably supporting said filter on said housing upstream of said air movement means in a manner so that all air flowing through said air passage passes through said filter, said filter being slidably inserted into and removed from said filter support means in directions transverse to a direction of air movement through said filter; a grille which is fixedly secured to said housing and extends across said inlet opening in said housing on a side of said filter remote from said air movement means; said housing having therein a further opening through which said filter can be slidably inserted into and removed from said filter support means.

7. The fan apparatus of claim 6, wherein said filter support means includes two spaced U-shaped bracket portions which each include two leg portions connected by a bight portion, and means for fixedly supporting one of said leg portions of each said bracket portion on said housing, said filter having two opposite edge portions which are each slidably received between said leg portions of a respective said bracket portion.

8. The fan apparatus of claim 7, wherein said bight portions of said bracket portions extend approximately parallel to each other.

9. The fan apparatus of claim 7, wherein said leg portions of each said bracket portion converge slightly with respect to each other in a direction away from said bight portion, and wherein each said bracket portion has a small degree of flexibility and inherent resilience, the distance between said leg portions being such that the leg portion of each said bracket portion other than said one leg portion thereof resiliently presses against said filter and thereby frictionally resists sliding movement of said filter relative to said bracket portions.

10. The fan apparatus of claim 7, wherein said bracket portions are each an integral portion of said grille.

11. The fan apparatus of claim 10, wherein said bight portion of each said bracket portion extends outwardly from said grille in a direction into said housing, said filter being disposed against said grille on a side thereof nearest said air movement means.

12. The fan apparatus of claim 7, wherein said filter is a furnace filter of approximately rectangular shape and has a thickness substantially less than the length of each side thereof.

* * * * *